United States Patent [19]

Thillays

[11] 4,100,422
[45] Jul. 11, 1978

[54] LIGHT CONDUCTOR IN A SIGNAL ISOLATOR

[75] Inventor: Jacques Claude Thillays, Herouville-St-Clair, France

[73] Assignee: U.S. Philips Corporation, New York, N.Y.

[21] Appl. No.: 715,302

[22] Filed: Aug. 18, 1976

[30] Foreign Application Priority Data

Aug. 29, 1975 [FR] France .............................. 75 26628

[51] Int. Cl.² ............................................. G02B 27/00
[52] U.S. Cl. ....................................... 250/551; 357/19
[58] Field of Search ................. 357/19; 250/551, 227; 350/96 R, 96 B, 96 C

[56] References Cited

U.S. PATENT DOCUMENTS 3,358,146  12/1967  Ing ........................................ 250/551
3,976,877  8/1976  Thillays ................................. 250/227

FOREIGN PATENT DOCUMENTS 2,106,710  6/1972  France ................................. 250/551

Primary Examiner—David C. Nelms
Attorney, Agent, or Firm—Frank R. Trifari; Simon L. Cohen

[57] ABSTRACT

A conductor for the transport of light between a photoemitter and a photosensitive receiver.

Light conductor comprising a conductor element having total reflection the main face of which has substantially the shape of a hemispherical surface part and in which the emitter and the receiver are situated diametrically in the vicinity of the spherical surface part.

Application especially to photocouplers having a semiconductor emitter and receiver.

31 Claims, 20 Drawing Figures

LIGHT CONDUCTOR IN A SIGNAL ISOLATOR

The invention relates to a light conductor and to photo-couplers comprising said light conductor.

The term "light" hereinafter refers to the electromagnetic spectrum, especially the part thereof extending mainly from the infrared up to and including the ultraviolet.

It is known that for the manufacture of photo-couplers three methods are used in optoelectronics for mounting the light emitter and the light receiver.

According to the first method, a light emitter element and a light receiver element are each accommodated in a housing, then enveloped with a resin which ensures a coupling by a plate having parallel sides.

The second method consists of assembling the light emitter and light receiver in a single envelope or a single housing and then connecting them by a transparent cement which facilitates the light passage and ensures the insulation of the relevant parts.

According to the two preceding mounting methods the emitter and the receiver should be provided on the same optical axis opposite to each other; the positioning is an extremely difficult and comparatively aleatory operation involving a low production efficiency. Furthermore the transfer efficiency which depends mainly on the distance between the emission face and the reception face and on the parallelism of these is subject to great variations between individual assemblies because said distance can be determined only by approximation.

According to a third mounting method it has also been proposed to provide the emitter and the receiver in the same plane and to connect them by an optical fiber; experience proves that the mounting is expensive and difficult to realize, that the resulting device is fragile and that the light transfer is low as a result of losses.

In order to mitigate these drawbacks and to obtain a restriction of the cost-price of the resulting device, Applicants have suggested a solution which is the subject of French Patent No. 2,106,710; in the device described in said Patent Specification the light emitter and the light receiver are co-planar and are provided on the same support opposite to a concave mirror of elliptical or possibly spherical shape.

However, this solution is useless for photo-couplers which must support a high voltage between emitter and receiver because the metal layer of which the mirror consists introduces a low impedance in a part of a circuit which it is just desired to be insulating.

It is the object of the present invention which relates to a light conductor to mitigate these drawbacks. It is based on the idea that it is not necessary in such a device for the light transmission to be stigmatic and it takes into consideration the properties on the one hand of the total reflection and on the other hand of the spherical surfaces, notably hemispheres. Applicants have found that by the combination of said properties a "trap" for the light can be obtained in certain cases which enables the transmission thereof.

The present invention relates to a light conductor and is characterized in that it comprises at least an element for guiding light by total reflection, which element is formed from a material having an index of refraction $n_1$ and shows a first major face which adjoins an exterior medium having an index of refraction $n_2$ which is lower than $n_1$, the first major face having the shape of a part of the surface of a sphere, said part being situated on either side of an arch of a great circle of the said sphere and in which in the proximity of a first end of the arch an injection zone of the light is situated and in the proximity of a second end a receiving zone for the light is situated, the place of the injection and receiving zone being such that the distance between each of the said zones and the center of the sphere is at most equal to the radius of the said sphere and is at least equal to the product of the radius of the sphere and the sine of the limit angle corresponding to the said indices $n_1$ and $n_2$.

As is known, the limit angle $\theta$ is related to the indices of refraction $n_1$ and $n_2$ by the relationship $\sin \theta = (n_2/n_1)$.

As will be demonstrated hereinafter, the injection zone is preferably provided so that the distance between it and the center of the sphere is larger than (11/10) of the product of the radius with the sine of the limit angle, in particular when the injection is punctiform.

Such a device has numerous advantages. As is also demonstrated, for example, hereinafter, the light transmission is excellent. The direction of propagation of the light can be varied, while maintaining the losses within reasonable limits. On the other hand, according to the application envisaged for the conductor, this and the conductor element which it comprises may be given different shapes each having their own advantages and certain of which are described in detail in the description of the Figures. The said arch of the great circle around which the said part of the said spherical surface is situated may preferably be substantially half a great circle which facilitates inverting the direction of the light and hence manufacturing devices in which the emitter and the receiver are co-planar; the arch may also be substantially a circle.

The arch of the great circle around which the said first face of the conductor element is situated, the plane of the said arch, and the chord which subtends same, are hereinafter referred to as main arch (possibly half main circle or main circle), main plane and chord (possibly main diameter). The radius of the great circle is termed $R$ and the limit angle is denoted by $\theta$, said letters being possibly followed by an index.

The first main face of the conductor element preferably is a part of a symmetrical spherical zone. The arch which is perpendicular to the main arch which forms the zone is hereinafter referred to as secondary arch.

The transfer efficiency is maximum and the conductor element is particularly rigid when the first main face is a hemisphere.

The conductor element is preferably bounded by a second main face opposite to the first and, possibly, laterally by two flat base parts. In order to reduce the volume, the conductor element may simply have the shape of a spherical ungula or substantially that of a symmetrical spherical segment having two bases, which give a great rigidity.

If in this case one wants to benefit by a minimum volume, the secondary arch which forms the said spherical zone is preferably as small as is permitted by the mechanical strength. Actually, for any conductor element in the form of a symmetrical spherical segment which is formed by a secondary arch having a value between zero and $\pi - 2\theta$, the aperture of the conductor element may be considered to be equal to $\pi - 2\theta$; so the light transfer is not affected by the length of the secondary arch.

On the other hand, if it is desired to transfer a maximum amount of light and the volume is indifferent, a secondary arch may be chosen, the value of which is larger than $\pi - 2\theta$; the aperture of the conductor element is then proportional to the length of said arch. The conductor element may substantially have the shape of a hemisphere, that of a sphere or that of two hemispheres which are connected via their second major face.

The second main face may be substantially flat and substantially parallel to the tangential plane at the summit of the said first main face. This shape gives a particularly large mechanical rigidity.

The second main face may also comprise a cavity, which facilitates reducing the weight of the light conductor, without loss of light as will be demonstrated hereinafter.

The second cavity is preferably bounded by a spherical part of a surface which is co-axial to the first main face and the first and second main faces are concentric and homothetic which simplifies the moulding. If the cavity has a radius equal to the product $R \sin \theta$, the light transfer is identical to the light transfer of the same conductor element comprising no cavity. On the contrary, if the cavity is bounded by a spherical surface the radius of which is larger than $R \sin \theta$, the transferred energy is equal, with the exception of a few losses, but because the light beam remains concentrated the brightness is greater.

These and further embodiments of the invention will be described in greater detail with reference to the accompanying drawings.

In order to simplify the drawings, the present invention without showing the exterior medium which in fact is usually air, and has an index $n_2$ equal to 1.

FIGS. 1a–g form an assembly of theoretical figures in which the path of light rays is indicated as originating from points situated on the main diameter of a transparent hemisphere and from which it appears that path is situated in a cortical region.

FIGS. 1a and 1b show the path of two light rays incident at the same angle from the same source point, in two cases having slightly different figures; the two light rays shown in FIG. 1a experience, before emergence, the same number of reflections while one of the light rays shown in FIG. 1b, before emergence, experiences one reflection more than the other.

FIG. 1c introduces the limit of the cortical region of the spherical conductor according to the invention by showing the path of the light rays of maximum incidence originating from three source points which are situated at different distances from the center.

FIG. 2a is a plan view and FIG. 2b a sectional view taken on the line B—B in FIG. 2a.

FIGS. 3a –d are also theoretical figures showing the propagation of light rays in a diametrical plane of a conductor element the second face of which comprises a hemispherical cavity, for several mutual values of the radius $r$ of the cavity with respect to R and $R \sin \theta$. This radius $r$ is smaller than $R \sin \theta$ for FIG. 3a, equal to $R \sin \theta$ for FIG. 3b and situated between $R \sin \theta$ and R for the figures 3c and 3d.

Figure 4A:
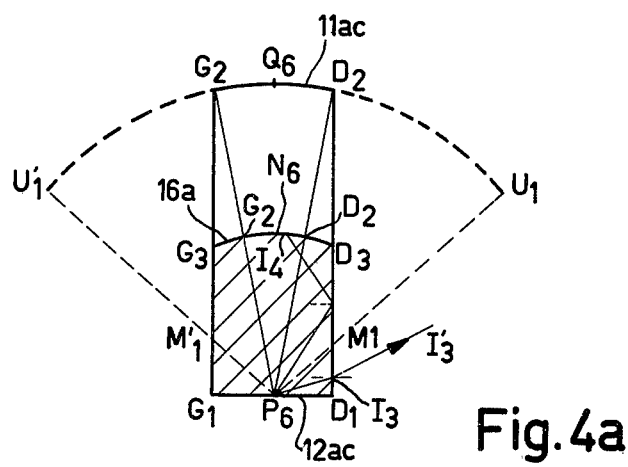
Figure 4B:
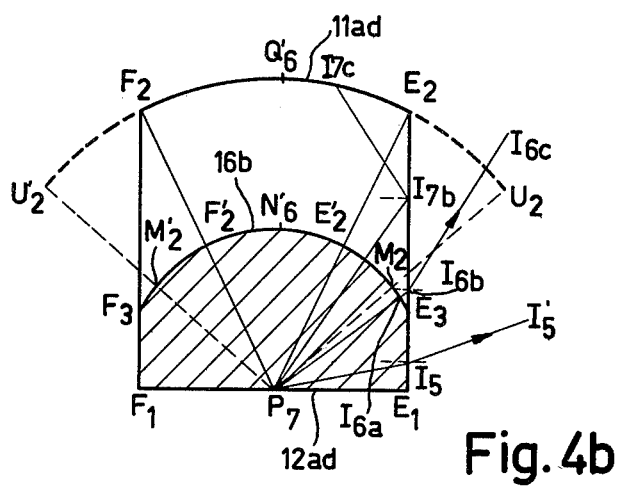
Figure 4C:
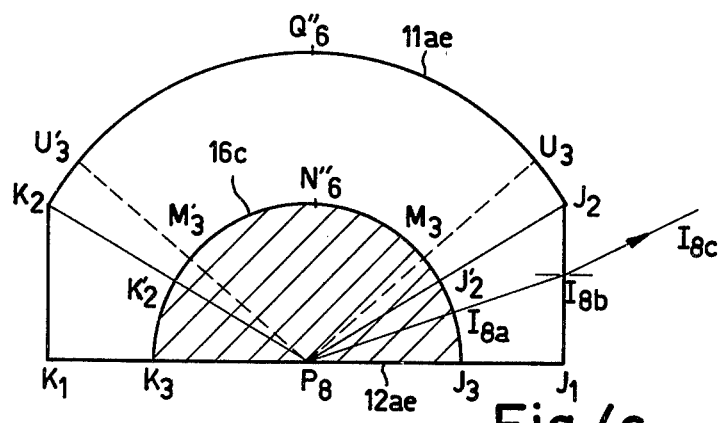

FIGS. 4a, 4b and 4c are sectional views in the plane perpendicular to the main diameter at the level of the source point in the case in which the conductor element has the shape of a symmetrical spherical segment having two bases, for three different apertures of the conductor element.

Figure 5A:
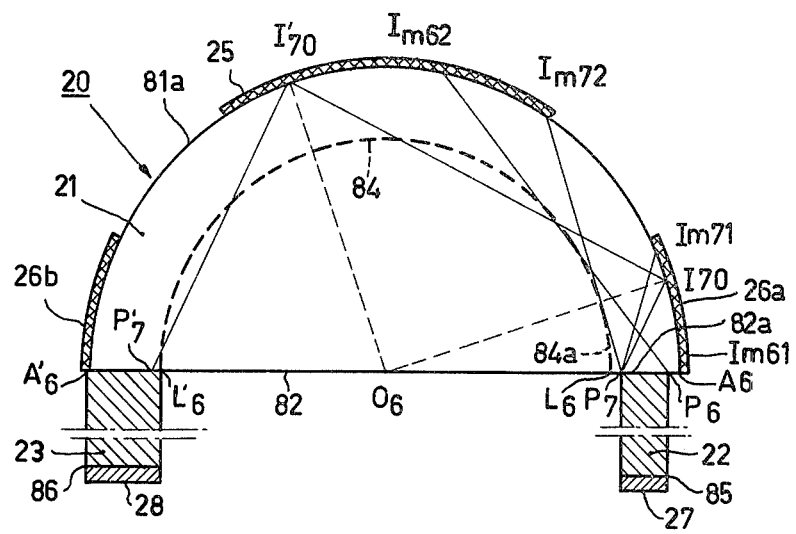
Figure 5B:
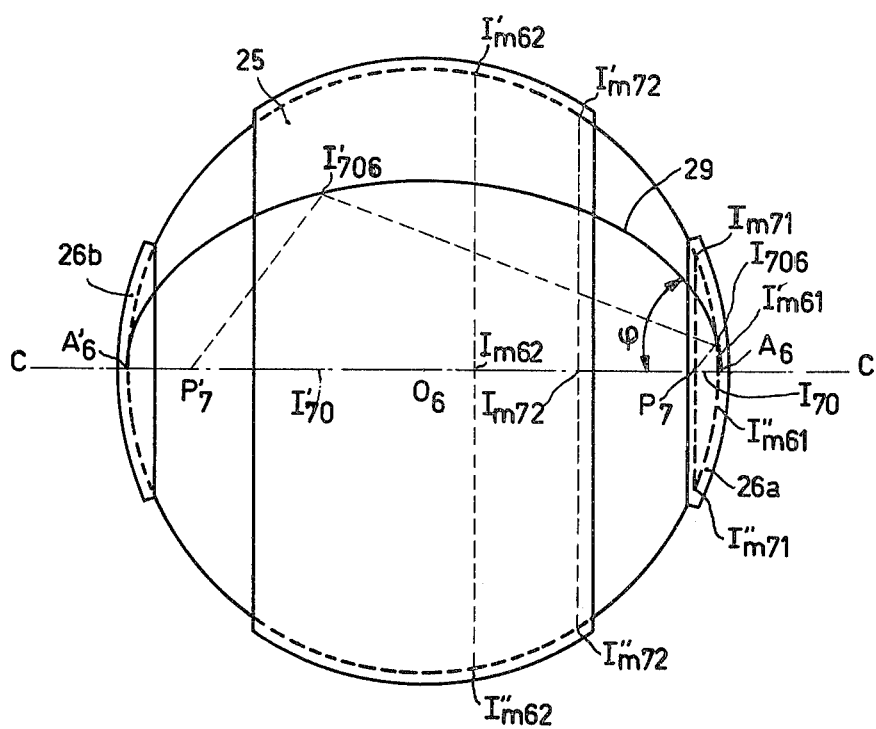

FIGS. 5a and 5b are a sectional view (taken on the line CC of FIG. 5b) and a plan view, respectively, of a light conductor according to the invention the conductor element of which comprises complementary metalisation faces.

Figure 6A:
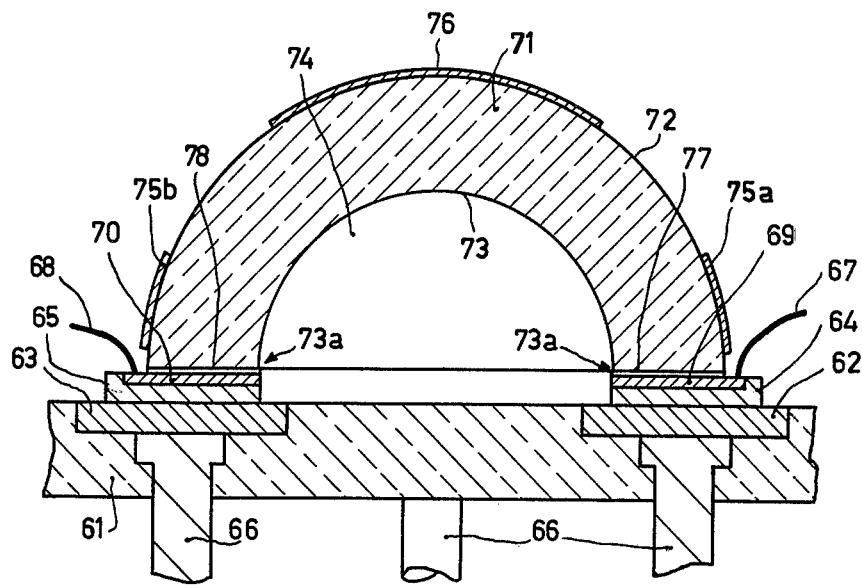
Figure 6B:
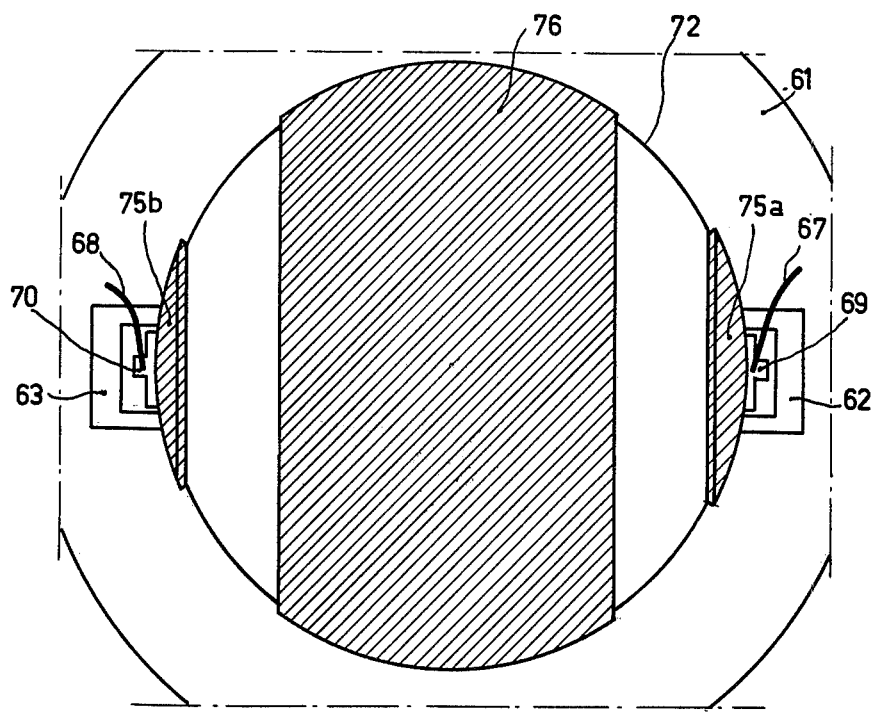

FIGS. 6a and b show the assembly of a photocoupler according to the invention, as a sectional view in FIG. 6a and as a plan view in FIG. 6b.

In FIG. 1, a semicircle 1a having center O and radius R subtended by a main diameter AA' denotes the circumference of a cross-section of a semi-circular body 2. The broken line circle 1a' is the symmetry thereof with respect to AA'.

The extremity A of the diameter AA'0 is termed injection extremity and the extremity A' is termed receiving extremity of the light rays.

Each light ray which is incident from the interior and which impinges upon the wall of a sphere having an index of refraction $n_1$ which is larger than 1, which wall is present in a medium having an index of refraction $n_2$ which is smaller than $n_1$ at an angle of incidence $i$ which is so much larger than the limit angle $\theta$ for total reflection, is reflected; because the curvature of a sphere is constant, said light ray again meets the surface of the sphere under the same angle of incidence $i$; so this is trapped definitely within the sphere in which it traverses, in the diametrical plane in which it is situated, a series of chords of equal length, which chords subtend equal archs of the same great circle, unless a cut in a given point of the sphere modifies the travel of the ray and possibly permits it to emanate and to be collected.

Figure 1A:
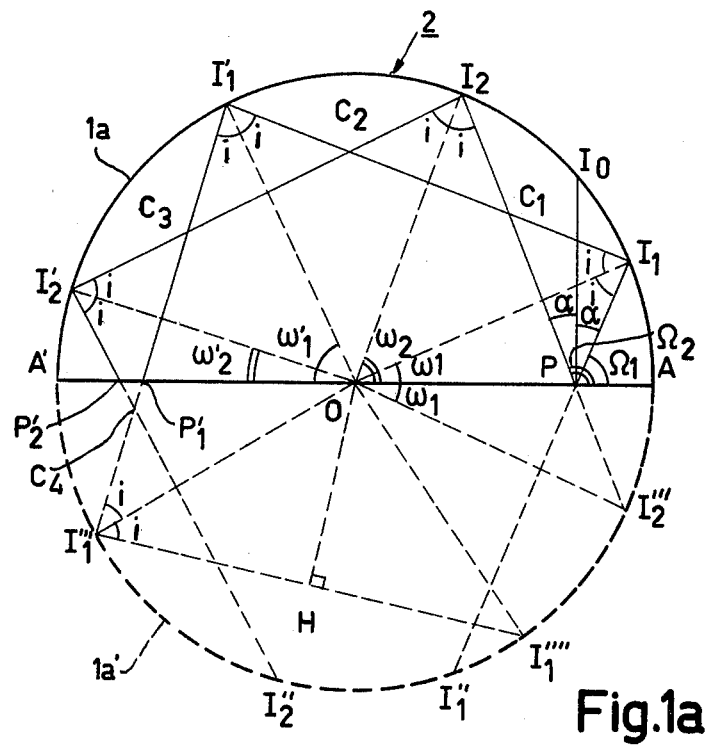
FIG. 1d shows the path of two maximum opening rays for a beam of rays originating from a source point in the cortical region within which beam the rays traverse a path through the cortical region.
FIG. 1e shows the path of light rays originating from a source point situated near the injection end of the main diameter.
FIGS. 1f and 1g show the path of eleven rays through the cortical region, which rays form part of the same beam. For reasons of clarity the beam is divided into two parts; one is described in FIG. 1f, the other in FIG. 1g.

FIG. 1a shows such a light ray P $I_1I'_1$ which originates from a point P and is collected in the hemisphere 2 in the plane of the drawing and which impinges upon the outer surface of said hemisphere at $I_1$ and $I'_1$ at an angle of incidence which is constantly equal to $i$ until it emerges at $P'_1$.

In FIG. 1a the straight lines $I_1P$ and $I'_1P'_1$ have been prolonged to beyond P and $P'_1$, respectively, and their point of intersection with the semi-circle 1a' has been denoted by $I''_1$ and $I'''_1$.

For clarifying the remainder of the figure, the chord $I'''_1I''''_1$ has been drawn in the lower hemisphere. The length of each chord of which a light ray of angle of incidence $i$ traverses at least a part, is $2R \cos i$; the distance thereof to the center, the length of the apotheme OH, is $R \sin i$, and the angle in the center, which corresponds to said chord (for example $I'''_1OI''''_1$) is equal to $\pi - 2i$.

The calculation indicates the angle of incidence $i$ (always smaller than $\pi$) of a light ray on the sphere as a function of the radius R of the sphere, of the distance 1 between the light point P in question at the center O of the sphere and of the distance $x$ between the center O and the projection of the first point of impact of the said light ray on the diameter AA'.

$$\cos i = \frac{R^2 - lx}{R\sqrt{R^2 - 2lx + l^2}} \quad (1)$$

There are two rays emanating from P which impact on the circle 1a for the first time at an angle $i$; the horizontal projection of these impacts is:

$$x_1, x_2 = \frac{-R^2 \sin^2 i \mp R \cos i \sqrt{l^2 - R^2 \sin^2 i}}{l} \quad (2)$$

The first point of impact of the second ray which originates from P and which impinges on the sphere 2 in the plane of the drawing at the angle $i$ is shown in FIG. 1a at $I_2$, the next point of impact at $I'_2$ and the emerging point from the hemisphere 1a at $P'_2$. The elongation of the straight line $I'_2P'_2$ on the side $P'_2$ intersects the semi-circle 1a' at $I''_2$ and the elongation on the side P of the straight line $PI_2$ intersects the semi-circle 1a' at $I'''_2$.

The light rays $PI_1I'_1P'_1$ and $PI_2I'_2P'_2$ originating from the same point meet each other again in points which are denoted by $C_1$, $C_2$ and $C_3$.

Hereinafter, the angle $\omega$, possibly followed by an index, refers to the first central angle of impact. The angle $\omega$ is the central angle which is formed by the line OA and the line $OI_1$, $OI_2$, $I_1$ and $I_2$ being the first point of impact. This angle is always smaller than $\pi - 2i$.

$$\omega < \pi - 2i \quad (3a)$$

At least the smaller of these two angles is smaller than $\pi/2$. Hereinafter, the smaller of the two angles is denoted by the index 1 and the larger angle, as well as the corresponding light rays, are denoted by the index 2.

Consequently, the central angles $\widehat{AOI_1}$ and $\widehat{AOI_2}$ are denoted by $\omega_1$ and $\omega_2$.

$$\omega_1 < \omega_2 \quad (3b)$$

$$\omega_1 < (\pi/2) \quad (3c)$$

On the other hand $$\cos \omega_1 = (x_1/R) \quad (3d)$$

and $$\cos \omega_2 = (x_2/R) \quad (3e)$$

From FIG. 1a it appears that there is symmetry between on the one hand $I'''_2$ and $I_1$ and on the other hand between $I''_1$ and $I_2$, with respect to the diameter A'A and that $\widehat{AOI'''_2} = \widehat{AOI_1} = \omega_1$.

In fact
$$\widehat{I_2OI'''_2} = \pi - 2i \; \omega_1 + \omega_2 = \pi - 2i \quad (3f)$$

$$\omega_1 < \pi - 2i \quad (3g)$$

$$\omega_2 < \pi - 2i \quad (3h)$$

In fact the unequality (3h) implies the unequality (3g).
On the other hand it appears from the figure that the point O is a center of the order $(2 \pi/\pi - 2i)$.
As a result of this the angles $\widehat{I'''_2OI_1}$, $\widehat{I_2OI'_1}$, $\widehat{I'_2OI'''_1}$ are mutually equal and are equal to $2 \omega_1$.

Considered furthermore in this application are: - the angles $\widehat{I_1PA}$ and $\widehat{I_2PA}$ which are denoted by $\Omega_1$ and $\Omega_2$. Because $$\widehat{I_1PA} = \widehat{I'''_2PA} \text{ and } \widehat{I_2PA} = \widehat{I''_1PA} \; \Omega_1 + \Omega_2 = \pi \quad (4a)$$

and because one has $$\Omega_1 = \omega_1 + i \quad (4b)$$

$$\Omega_2 = \omega_2 + i \quad (4c)$$

one has
$$\Omega_2 > \Omega_1 \quad (4d)$$

the angles $\widehat{I_1PI_0}$ and $\widehat{I_2PI_0}$, which make $PI_1$ and $PI_2$ with the normal $PI_0$ and OA; these two angles are equal and are denoted hereinafter by $\alpha$. It is obvious that $$\alpha = (\pi/2) - \Omega_1 = \Omega_2 - (\pi/2) \quad (5a)$$

$$2\alpha = \Omega_2 - \Omega_1 = \omega_2 - \omega_1 \quad (5b)$$

$$\alpha = (\pi/2) - (i + \omega_1) = i + \omega_2 - (\pi/2) \quad (5c)$$

or
$$2\omega_1 = \pi - 2i - 2\alpha \quad (5d)$$

and
$$2\omega_2 = \pi + 2\alpha - 2i \quad (5e)$$

and
$$0 < 2\alpha < \pi - 2i \quad (5f)$$

It is shown in FIG. 1a that the central angles $\widehat{I_1OI_2}$ and $\widehat{I'_1OI'_2}$ are equal to $2\alpha$ and that the central angles $\widehat{AOC_1}$, $\widehat{AOC_2}$, $\widehat{AOC_3}$ are equal to
$\omega_1 + \alpha$, $2(\omega_1 + \alpha)$, $3(\omega_1 + \alpha)$, respectively, and so on.

the central angles which intercept the archs situated between the collecting extremity of the main diameter and the last point of impact before emergence and which are termed last central impact angle and are denoted by $\omega'$ possibly followed by an index, said index being that of the corresponding first central impact angle of the ray in question. Consequently, the angles $\widehat{I'_1OA'}$ and $\widehat{I'_2OA'}$ are denoted by $\omega'_1$ and $\omega'_2$. It is obvious that $$\omega' < \pi - 2i \quad (6a)$$

$$\omega'_1 < \pi - 2i \quad (6b)$$

$$\omega'_2 < \pi - 2i \quad (6c)$$

Because the various points of impact of the same light ray in a path through the cortical region are separated by archs which are equal to $\pi - 2i$, the number N of impacts on the said path depend on the length of the main arch, on the value of the angle of incidence $i$ and on that of the first central impact angle $\omega$.

If the main arch is a semi-circle, the number N of impacts before emergence are obtained by adding 1 to the integer $q$ which is the quotient of $\pi - \omega$ by $\pi - 2i$.

$$N = q + 1 \quad (9a)$$

and the value $\omega'$ of the last central impact angle is:

$$\omega' = \pi - N - q(\pi - 2i) \quad (9b)$$

The larger $i$, the larger is the number of impacts of the same light ray on an arch of a given length.

It may also be written that:

$$q = \frac{\pi - \omega - \omega'}{\pi - 2i} \quad (9c)$$

with
$$\omega < \pi - 2i \quad (3a)$$

and
$$\omega' < \pi - 2i \quad (6a)$$

Figure 1B:
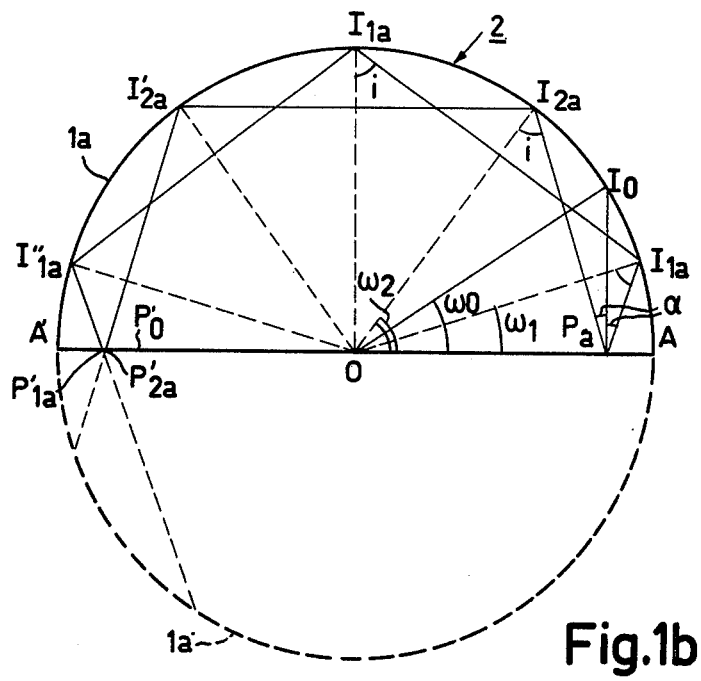
Figure 1C:
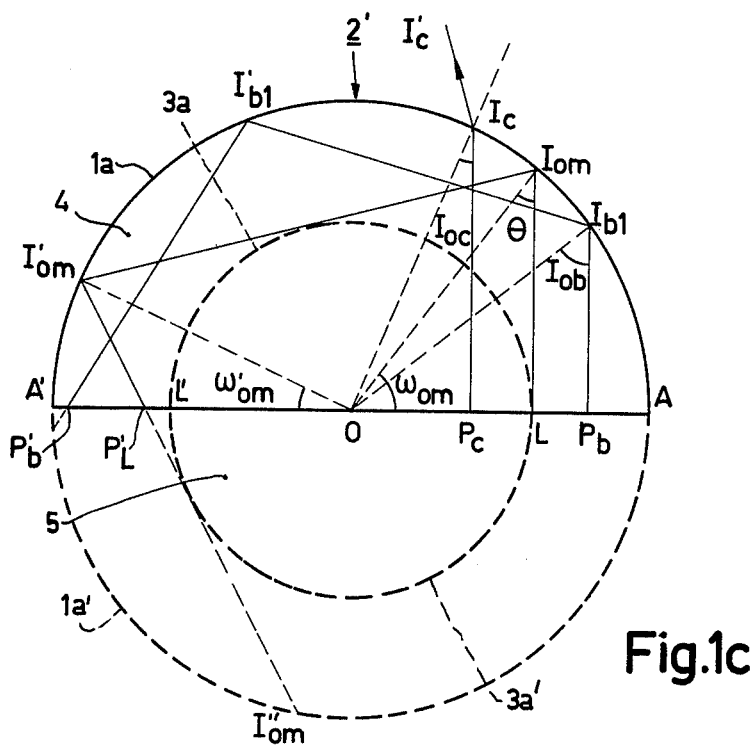

For example, for the light rays for which $\Omega_1 = \Omega_2 = \Omega = 90°$ originating from source points situated at different distances from the centers, such as those as shown in FIG. 1c, which will be described in detail hereinafter. $LI_{om}I'_{om}P'_L$ or $P_bI_{b1}I'_{b1}P'b$ and of which for the immediately following the angle of incidence can generally be denoted by $i_s$: $\omega = (\pi/2) - i_s$, $\omega'$ can be calculated according to the number of impacts:
$N = 1$ $q = 0$ $\omega' = i_s + (\pi/2)$ $N = 2$ $q = 1$ $\omega' = 3i_s - (\pi/2)$ $N = 3$ $q = 2$ $\omega' = 5i_s - 3(\pi/2)$
$N = 4$ $q = 3$ $\omega' = 7i_s - 5(\pi/2)$ etc... (9d)

The limits within which in each case the angle of incidence and the position of the source points on OA can vary can be calculated from the two conditions:

$$\omega' < \pi - 2i \quad (6a)$$
and
$$\omega' > 0$$

$N = 1$    $i_s < 30°$      $OP < \frac{R}{2}$ $N = 2$    $30° < i_s < 54°$    $\frac{R}{2} < OP < \frac{4R}{5}$ $N = 3$    $54° < i_s < \frac{5\pi}{14}$    $\frac{4R}{5} < OP < 0.89R$ $N = 4$    $\frac{5\pi}{14} < i_s < 70°$    $0.89R < OP < 0.94R$ For the two rays originating from the same source point P and having the same angle of incidence $i$ $$q_1 = \frac{\pi - \omega_1 - \omega'_1}{\pi - 2i} \quad (10a)$$

$$q_2 = \frac{\pi - \omega_2 - \omega'_2}{\pi - 2i} \quad (10b)$$

$$\omega'_1 = \pi - \omega_1 - q_1(\pi - 2i) \quad (10c)$$

$$\omega'_2 = \pi - \omega_2 - q_2(\pi - 2i) \quad (10d)$$

with the above-stated conditions $$\omega_1 < (\pi/2) \quad (3e)$$

$$\omega_2 < \pi - 2i \quad (3h)$$

$$0 < 2a < \pi - 2i \quad (5f)$$

$$\omega'_1 < \pi - 2i \quad (6b)$$

$$\omega'_2 < \pi - 2i \quad (6c)$$

At a given angle of incidence, $q_1$ and $q_2$ can assume only two relative values:
either $q_1 = q_2 = q$ (11a); this case is that of FIG. 1a.
or $q'_1 = q'_2 + 1 + q'$ (12a)
with $\omega_1 < \omega_2$. This case is that of FIG. 1b.

Although a thorough geometric study is not indispensable for the use of the invention, a few equations are given below which may be useful.

In the case in which $q_1 = q_2 = q$ (11a) - this case is that of FIG. 1a, for which $q = 1$ - one has the following equations:

$$q = \frac{\pi - \omega_1 - \omega'_1}{\pi - 2i} = \frac{\pi - \omega_2 - \omega'_2}{\pi - 2i} \quad (11b)$$

$$\omega'_1 = \pi - \omega_1 - q(\pi - 2i) \quad (11c)$$

$$\omega'_2 = \pi - \omega_2 - q(\pi - 2i) \quad (11d)$$

$$\omega_1 + \omega'_1 = \omega_2 + \omega'_2 = \pi - /q(\pi - 2i) \quad (11e)$$

$$\omega'_1 - \omega'_2 = \omega_2 - \omega_1 = 2a \quad (11f)$$

$$\omega'_1 + \omega_2 = 2\pi - (2q + 1)(\pi - 2i) \quad (11g)$$

$$2\omega'_1 = 2\pi + 2a - (2q + 1)(\pi - 2i) \quad (11h)$$

$$2\omega'_2 = 2\pi - 2a - (2q + 1)(\pi - 2i) \quad (11i)$$

It will be obvious that the following equations have to be realized:

$\omega'_2 < 2\omega_1$ otherwise $\omega'_1$ would be larger than $\pi - 2i$ (11j) or the number of impacts of the radius 1 would be $q + 2$, $\omega'_1 > 2a$ otherwise the number of impacts of the ray 2 would be $q$ (11k).

FIG. 1b shows in particular two rays $P_aI_{1a}I'_{1a}I''_{1a}P'_{1a}$ and $P_aI_{2a}I'_{2a}P'_{2a}$ originating from a source point $P_a$ with the same angle of incidence, which paths traverse through the cortical region and emerge, the former after three impacts and the second after two impacts on the hemispherical surface ($q'_1 = q'_2 + 1 = 2$). It will be obvious that the angles $i, a, \omega_1$ and $\omega_2$ which characterize the light rays $I_{1a}$ and $I_{2a}$ have the same definitions as before; only the values are different.

In the case in which $q'_1 = q' = q'_2 + 1$ (12a) the following equations may be established:

$$q' = \frac{\pi - \omega_1 - \omega'_1}{\pi - 2i} = \frac{2(\pi - i) - \omega_2 - \omega'_2}{\pi - 2i} \quad (12b)$$

$$\omega'_1 = \pi - \omega_1 - q'(\pi - 2i) \quad (12c)$$

$$\omega'_2 = \pi - \omega_2 - (q' - 1)(\pi - 2i) \quad (12d)$$

$$\omega_1 + \omega'_1 = \pi - q'(\pi - 2i) \quad (12e)$$

$$\omega_2 + \omega'_2 = \pi - (q' - 1)(\pi - 2i) \quad (12f)$$

$$\omega'_2 - \omega'_1 = \pi - 2i - 2a \quad (12g)$$

$$\omega'_1 + \omega'_2 = 2\pi - 2q'(\pi - 2i) \quad (12h)$$

$$2\omega'_1 = \pi + 2a + 2i - q'(\pi - 2i) \quad (12i)$$

$$2\omega'_2 = 2\pi - 2a + (1 - 2q')(\pi - 2i) \quad (12j)$$

with the following conditions $$\omega'_1 < 2a \quad (12k)$$

$$\omega'_2 > 2\omega_1 \quad (12l)$$

In the case in which $\pi$ is a whole multiple of the sum $\omega_1 + a$ of the angles $\omega_1$ and $a$, that is a whole multiple of $\frac{1}{2}(\pi - 2i)$ and in which hence $2\pi = (N_1 + N_2)$ $$(\pi - 2i) \quad (13)$$

($N_1$ and $N_2$ being the number of impacts of the rays $I_1$ and $I_2$, respectively, originating from P having the same angle of incidence $i$), a crossing C of said light rays is situated at $OA'$ and the two rays of equal angle of incidence emerge and can be collected in the same point. In that case which is not shown in the figures, $\omega'_1 = \omega_2$ and $\omega_1 = \omega'_2$.

In all other cases, the rays having the same angle of incidence and originating from the same source point emerge in two different points, for example $P'_1$ and $P'_2$ in FIG. 1a and $P'_{1a}$ and $P'_{2a}$ in FIG. 1b.

These points can be determined by their distance to the centre $$OP_1 = \frac{-R \sin i}{\sin (i + \omega'_1)}$$

and $$OP_2 = \frac{-R \sin i}{\sin (i + \omega'_2)}$$

In any case, for a given angle of incidence $i$ the point of emergence can never be situated between the point O and the point $P'_o$ of which the distance $R \sin i$ to the point $\theta$ is equal to OH, the distance between the center O and the chords which are traversed by the light rays in question.

Because each light point P is the source of a beam of light rays having different angles of incidence, it will be obvious that also when the condition (13) is satisfied for a given angle of incidence, this need not apply to most of the others. The light originating from a point P is scattered along a light rod. There is light transfer, but there is no image of the point P.

If a light source in the form of a rod is placed along OA, a light spot is available at OA' in the form of a rod which is no image of the rod-like source.

Each source P is the origin of a beam of light rays of which the angle of incidence on the sphere in the plane of the drawing varies (if the source emits in all directions) between zero, the value of the angle of incidence of the light ray PA, and a maximum value which is obtained for the normal light ray on the diameter OA. Such a light ray is shown between the source thereof and the first impact thereof (the continuation of the path is not shown for reasons of clarity), for example in FIG. 1b at $P_aI_o$. The angle of incidence $i_o$ thereof is the maximum angle of incidence of the light rays originating from $P_a$. For this light ray $\alpha = 0$ and the first central impact angle is:

$$\omega_o = (\pi/2) - i_o \text{ and } OP_a = R \sin i_o$$

The angle of incidence of the other light rays originating from a given source point, for example $P_a$, decreases progressively on either side of said ray $P_aI_o$ according as $\alpha$ increases.

On the other hand, the value of said maximum angle of incidence varies with the position of the source point on the half diameter OA. Said value decreases when the source point P approaches O (for P in O the incidence would be zero) and increases when the source point P approaches A (for P in A the incidence would be equal to $(\pi/2)$.

FIG. 1c shows the light ray with maximum incidence for three positions $P_c$, L and $P_b$ of the source point. It will be obvious from the figures that the angles of incidence $i_{oc}$ and $i_{ob}$ increase from $P_c$ to $P_b$.

In the same FIG. 1c and the following figures are shown in broken lines the semi-circle of center O and of radius $R \sin \theta$, $\theta$ being the limit angle of the transparent hemisphere with respect to the medium in which it is present. The light used in the conductor element of the conductor according to the invention can propagate within the cortical region 4 formed by the circles 1a and 3a. The semi-circle 3a intersects the main diameter AA' in the limit points L and L'.

In this FIG. 1c the semi-circles 1a' and 3a' are also shown in broken lines and are symmetrical with respect to the semi-circles 1a and 3a on the other side of the diameter AA'.

Each light ray, for example, $P_cI_c$ originating from a point of the region 5 of the hemisphere 1 which is situated within said hemispherical limit surface 3 impinges on the hemispherical surface 1 at an angle of incidence which is smaller than the limit angle $\theta$. So said light ray emerges from the conductor element as is shown in FIG. 1c at $I'_c$ and can be reflected only in the presence of a complementary metallization.

Each light ray originating from a point, for example L, which is situated on the limit surface 3 and which propagates tangentially to said limit surface, impinges on the face 1 at an angle of incidence which is equal to the limit angle $\theta$ in a point, for example $I_{om}$. It forms the limit ray which is reflected again at $I'_{om}$ before being collected at $P'_L$.

The elongation $P'_L I''_{om}$ of the radius $I'_{om} P'_L$ is also shown in broken lines in the figure. The chords $I_{om}I'_{om}$ and $I'_{om}I''_{om}$ are tangents to the circle 3a, 3a'. If the first central impact angle $\widehat{AOI}_{om}$ of value $(\pi/2) - \theta$ is termed $\omega_{om}$ and the last central impact angle $\widehat{A'OI'}_{om}$ is denoted by $\omega'_{om}$, a simple calculation enables to calculate the distance $OP'_L$ between the centre O and the point of emergence $P'_L$ of the limit ray.

In the case of the figure, for which the limit angle $\theta$ lies between 30° and 54°, the number of impacts of the light ray $LI_{om}I'_{om}P'_L$ is $2(q=1)$, and $\omega'_{om} = 3\theta - (\pi/2)$.

A simple trigonometric calculation gives:

$$OP_L = \frac{R \sin \theta}{\cos 4\theta}$$

It is to be noted that if the light ray $LI_{om}$ is a limit ray, the point of emergence $P'_L$ thereof is in the general case no limit point; light rays originating from points of the source situated between L and A emerge on either side of $P'_L$.

Since the light ray $LI_{om}$ is perpendicular to OA, the incidence thereof is maximum and any other light ray originating from L and propagating in the plane of FIG. 1c impacts on the surface 1 at an angle of incidence which is smaller than the limit angle and emerges from the conductor element in the absence of a complementary metallization. No ray of this type is shown in FIG. 1c.

On the contrary, the angle of incidence $i_{ob}$ for the ray $P_b I_{b1} I'_{b1} P'_b$, originating from the source point $P_b$ situated between A and the limit point L on the outer segment of the diameter OA, is larger than $\theta$ and for any point of the cortical region 4 two limit light rays, hereinafter termed opening limit light rays, can be determined in each region on either side of the normal to the diameter through said source point which emanate on two first impact limit points, thereafter termed opening limit points, for which the angle of incidence is equal to $\theta$.

The light rays which originate from said source point and which are situated within the beam between the two opening limit rays and of which the first point of impact consequently is situated between the two opening limit points, impinge upon the surface of the sphere and an angle of incidence exceeding $\theta$; they are reflected and traverse a path through the cortical region.

The light rays outside the beam situated between said two opening limit light rays and of which the first point of impact is not situated between the two above-defined opening limit impact points, impinge upon the spherical surface at an angle of incidence which is smaller than $\theta$; they are not reflected and leave the sphere.

Figure 1D:
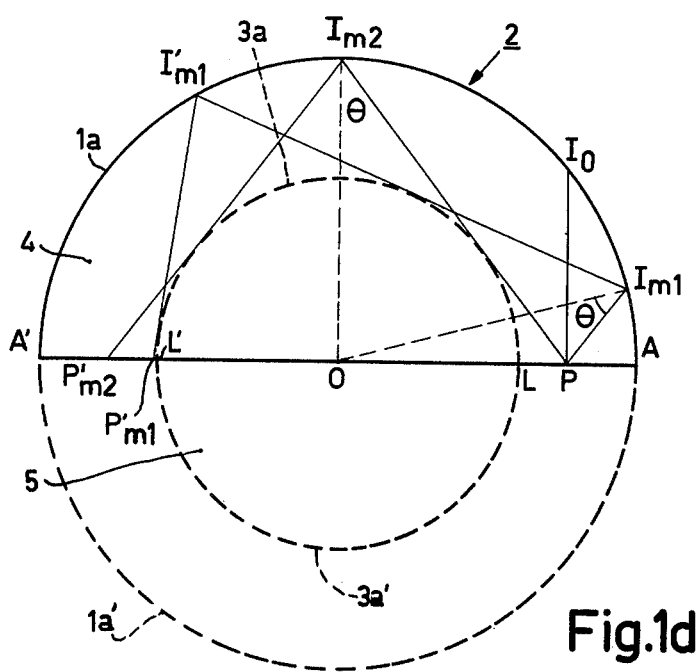

For clarity, FIG. 1d shows at $I_{m1}$ and $I_{m2}$ the two points of the first impact of the opening limit light rays originating from P and propagating in the plane of the drawing. The light rays $PI_{m1}$ and $PI_{m2}$, or their elongation, not shown in the drawing, as well as these same light rays after reflection $I_{m1}I'_{m1}$, $I'_{m1}P'_{m1}$ and $I_{m2}P'_{m2}$ are tangents to the circle 3a.

For the source point P the whole arch of $I_{m1}$ to $I_{m2}$ is reflecting: it is the reflection of this arch which the present invention uses.

In the absence of a complementary metallization the light rays originating from P and of which the first impact is between A and $I_{m1}$ on the one hand and beyond $I_{m2}$ on the other hand, experience no total reflection and they emerge from the spherical surface. In fact said light rays would intersect the central region 5 which does not transmit any light.

The angle within which the recovered rays are situated is termed opening of the conductor element in a considered plane and for a considered point. This opening angle, as regards point P in the plane of the FIG. 1d, is $\widehat{I_{m1}PI_{m2}}$.

Like the value of the maximum angle of incidence, the opening of the conductor element depends on the place of the source point P. This value is zero when P is in L and is maximum when P is in the proximity of A.

Figure 1E:
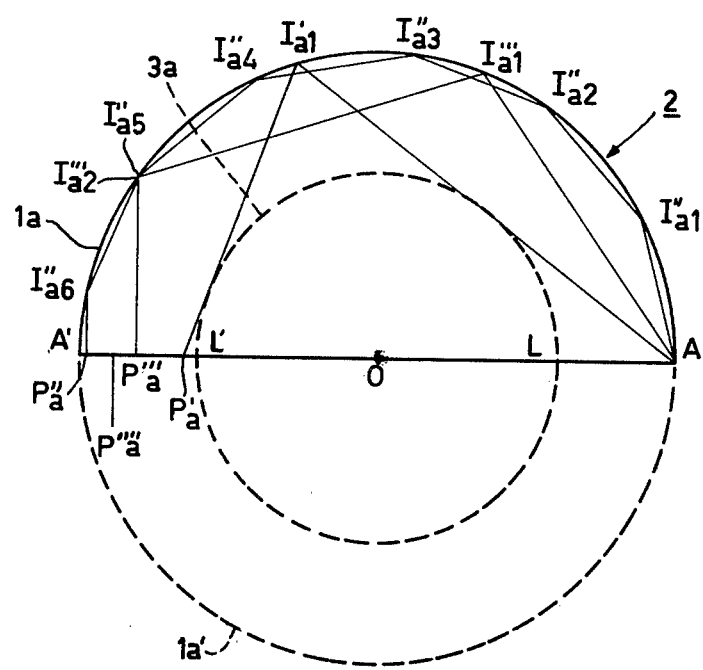

FIG. 1e relates to light rays originating from the source point A, the injection extremity of the main diameter.

In this figure is shown the opening limit light ray $AI'_{a1}P'_a$ which may be collected in the point $P'_a$ which lies near L'; a light ray of which the path in the cortical region extends along the circumference $AI''_{a1}I''_{a2}I''_{a3}I''_{a4}I''_{a5}I''_{a6}P''_a$ and which can be collected in the point $P''_a$ which lies near A' and a central light ray $AI'''_{a1}I'''_{a2}P'''_a$ of which, because the angle of incidence is equal to $(3\pi/10)$, the latter part of the path $I'''_{a2}$ is perpendicular to OA'. For these three rays, $\Omega$ is larger than $(\pi/2)$, the part of the beam for which $\Omega < \pi/2$ not being considered for this extreme point.

By means of the equations 11 and 12 given above it is possible to exactly determine the light distribution at the collecting extremity of the diameter AA' but this is not necessary for the comprehension and the use of the invention. The light is distributed between A' and $P'_a$, the strong light intensities being in the proximity of A' and the small ones near L'. In fact, as the angle $\Omega$ decreases, the emergence of the reflected light ray first moves from L' to A'; for the light ray (which is not shown in the figure for clarity) for which the impact takes place in the summit of the hemisphere 2 and for which $\Omega = (3\pi/4)$ the emergence takes place in A'. As the angle $\Omega$ decreases further, the emergence point moves in the opposite direction to in $P'''_a$; it then returns to A', then again towards L' to in $P''''_a$, the emergence point of the ray not shown in the figure of which the number of impacts is three and of which the last part of the path is perpendicular to OA', then again towards A', and so on.

It is to be noted that the emergence point $P'_a$ of the opening limit ray, that is the point of the light rod which is collected nearest to L' results from the value of the limit angle. If $\theta = 45°$, the emergence point of the limit ray would be in A' and the light ray would extend from A' to $P'''_a$, the diameter $\overline{LL'}$ of the circle 3a of course would be larger $(R/\sqrt{2})$. For other values of $\theta$ the emergence point of the opening limit ray would not be at an extremity of the collected light ray.

Figure 1F:
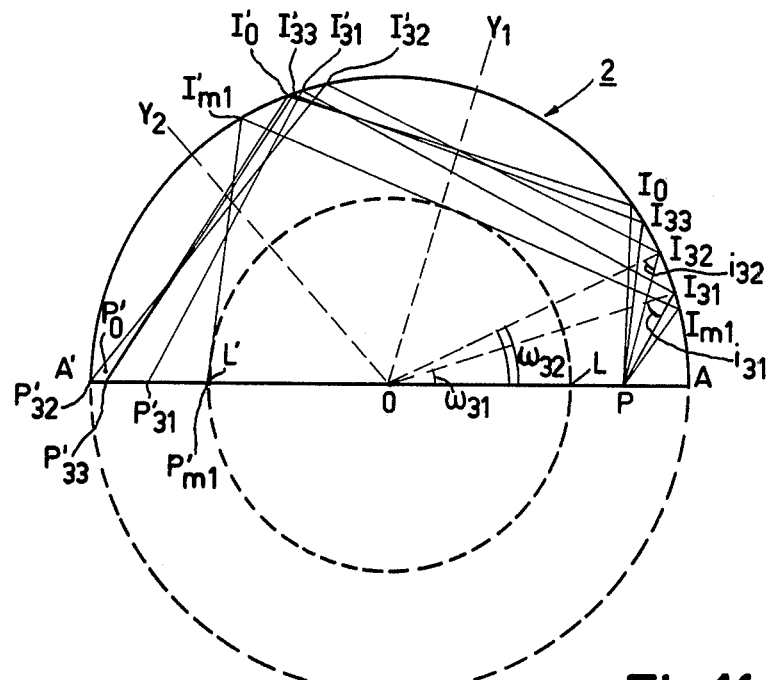
Figure 1G:
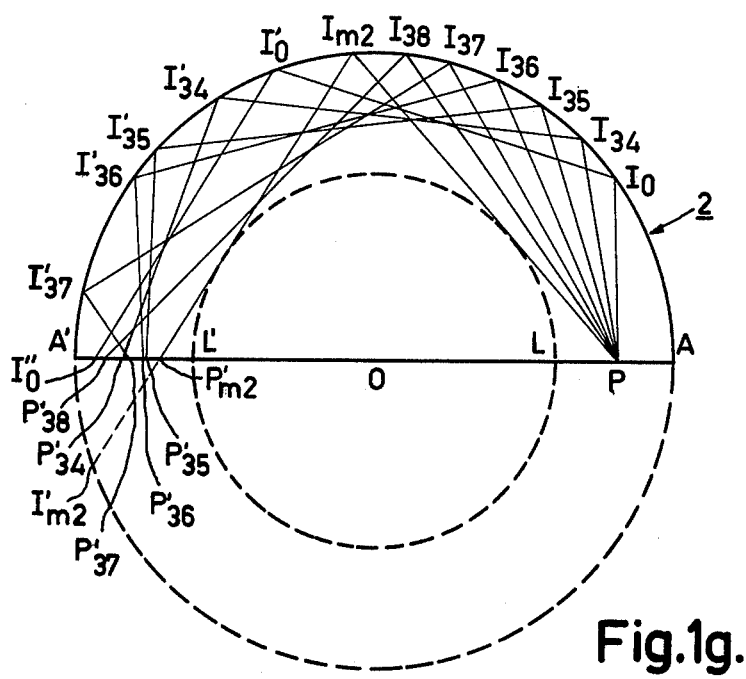

In FIG. 1f, the path in the cortical region of the light rays $PI_{m1}I'_{m1}P'_{m1}$, $PI_{31}I'_{31}P'_{31}$, $PI_{32}I'_{32}P'_{32}$, $PI_{33}I'_{33}P'_{33}$, $PI_oI'_oP'_o$ of the first half beam which originates from P is shown in such manner that the angles $\omega$ which OA makes with the light rays which they form, are smaller than $(\pi/2)$ and FIG. 1g the path in the cortical region of the light rays $PI_{34}I'_{34}P'_{34}$, $PI_{35}I'_{35}P'_{35}$, $PI_{36}I'_{36}P'_{36}$, $PI_{37}I'_{37}P'_{37}$, $PI_{38}P'_{38}$, $PI_{m2}P'_{m2}$ of the second half beam which originates from P is shown in such manner that the angles of the light rays which they form with A are larger than $(\pi/2)$.

For the first half beam shown in FIG. 1f it is seen that, when the various rays thereof are considered in the sequence in which $\omega$ decreases, that the point of the first impact moves away from $I_{m1}$ in the direction of the path of the light rays and that the length of the chords which are traversed by the light rays, as well as the archs which they subtend decrease. As a result of this there is a concentration of the whole beam or a part thereof during the travel of the first traversed chords. More correctly, if two rays, for example $PI_{31}$, having a first central impact angle $\omega_{31}$ and an angle of incidence $i_{31}$, and $PI_{32}$, having a first central impact angle $\omega_{32}$ and an angle of incidence $i_{32}$, in such manner that $\omega_{31} < \omega_{32}$ and $i_{31} < i_{32}$, moreover satisfy the condition $$\pi - 2i_{31} + \omega_{31} > \pi - 2i_{32} + \omega_{32} \tag{15a}$$

that is by introducing the angles $\alpha_{31}$ and $\alpha_{32}$ defined above according to the equation 5c, they satisfy the condition $$3(i_{32} - i_{31}) > \alpha_{31} - \alpha_{32} \tag{15b}$$

the sequence of impact of the two rays is inverted in the first main face between the first and the second impact, the point of impact $I'_{32}$ being nearer to $I_{m1}$ than the point of impact $I'_{31}$.

In the case in which the equation 15b is not satisfied, for example for the rays $I_{32}$ and $I_{33}$, the light rays cross each other and their points of intersection $I'_{32}$ and $I'_{33}$ approach each other.

As a result of this there is a concentration of the light beam and the arch which supports the various second points of impacts is generally smaller than the arch $I_{m1}I_o$ which supports the first point of impact.

It is seen, for example, in FIG. 1f, that on the two planes perpendicular to the plane of the drawing and of which $Y_1$ and $Y_2$ are the line of intersection in said plane of the drawing, the light rays of this first half of the beam form a light spot which does not cover the total segment of the cortical region. If for two light rays, for example $PI_{33}$ and $PI_{31}$, the equation $$5(i_{33} - i_{31}) > \alpha_{33} - \alpha_{31} > 3(i_{33} - i_{31}) \tag{15c}$$

is satisfied, the inversion of the point of impact of the light rays in question which have crossed each other between the first and the second impact and of which the second points of intersection have come nearer to the first points of intersection, occurs between the second and the third impact (unless there is collected, as in the figure at $P'_{31}$ and $P'_{33}$).

As long as the sequence of all the points of intersection is not inverted, the half beam in question remains narrow, from point of impact to point of impact, and the light spot which is collected in certain planes is localized.

As soon as the sequence of the points of impact is inverted, the deviation between the points of impact increases more and more and the beam is progressively scattered.

For the second half beam which originates from the point P which is shown in FIG. 1g, the length of the chords which are traversed by the light beam, as well as the archs which they subtend, increase when $\omega$ becomes larger and the first point of impact moves away from A; scattering of the light ray occurs.

The length of the arch $I'_oI'_{m2}$ along which the two points of impact are scattered is larger than the length of the arch $I_oI_{m2}$ of the first impact.

As a result of this, a light spot of a large area is generally collected when the light beam is intersected by a plane.

In general, the addition of the two half beams forms light spots of a large area which make it possible, when no optimum efficiency is desired, to determine without great accuracy the place of a possible collection device, the more so because the sources are never punctiforme. In extreme cases, however, it is useful to calculate or verify with the drawing whether the useful beam which originates from a given source point covers the area of collection.

It will be obvious from the above that the collecting area has much more chances of becoming smaller when the emission point is near the sphere of radius $R \sin \theta$ limiting the cortical region of the interior, especially when it is on the portion of the cortical segment having a length of approximately $(R(1 - \sin \theta)/10)$ and near the limit point and when $\theta$ is large. In fact when the various light rays originating from a given point are considered, the variations of the angle of incidence $i$ with the first angle of impact $\omega$ are smaller than the variations of $\alpha$.

Figure 2A:
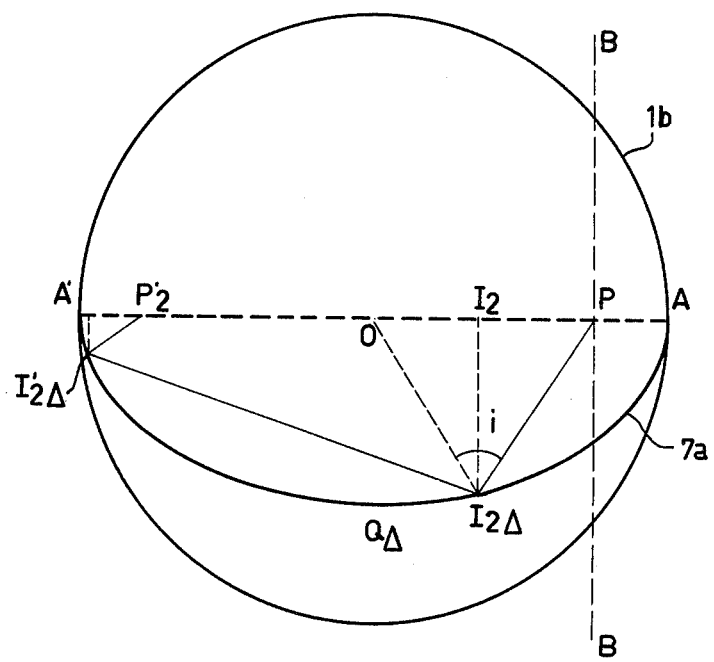
FIGS. 2a and 2b are also theoretical figures for studying the path of the light rays originating from the same point of a light source and propagating in different diametrical planes.
Figure 2B:
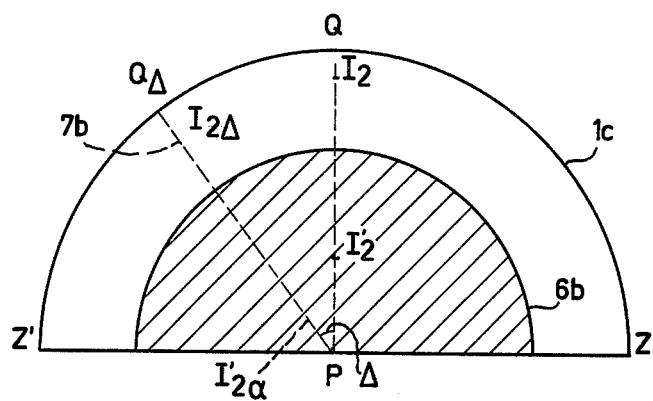

FIGS. 1a – g may be considered as the section in the main plane of a conductor element of which the first main face has either the shape of a hemisphere which is shown in a plan view in FIG. 2a and in a sectional view in FIG. 2b, the said section being taken on the line BB of FIG. 2a in the plane perpendicular at P to the plane of FIG. 1 or the shape of a spherical zone which is shown in cross-section in the same plane perpendicular to the plane of FIG. 1 and which passes through the point of the source described in FIGS. 4a, 4b and 4c.

In FIG. 2a, 1b denotes the circumference of the hemispherical surface 1 and, in broken lines, AA' denotes the main diameter with respect to the source point P.

FIG. 2b shows in solid lines at 1c the circumference of the hemispherical surface 1, at 6b a solid line denotes the circular circumference of the line of intersection of the plane of section with the hemisphere 1, Z and Z' denotes the extremities of the diameter perpendicular to AA' in the plane opposite to the summit Q of the hemispherical surface 1, and the sectional area is shaded.

The advantage of giving the spherical surface the shape of a hemisphere or at least that of a zone drawn through an arch exceeding $\pi - 2\theta$ is demonstrated hereinafter starting from the path of the rays originating from P and perpendicular to the diameter AA' in the various diametrical planes of the hemisphere through the said diameter AA'.

In FIG. 2a the light ray $PI_2I'_2P'_2$ of FIG. 1a is projected on a part of the main diameter AA', in FIG. 2b the same light ray is projected in broken lines on the segment which in the drawing joins O and $I_2$. FIGS. 2a and 2b show a second light ray originating from the point P and propagating in a diametrical plane which encloses an angle $\Delta$ with the plane of FIG. 1a and which in said plane impinges on the hemispherical surface at the same angle of incidence $i$.

The projection of the great circle which corresponds to said diametrical plane is denoted at 7a in FIG. 2a and at 7b in FIG. 2b, and the various points of incidence on the sphere of the said light ray are references $I_{2\Delta} I'_{2\Delta}$ and the ray reaches point $P'_2$.

All light rays originating from a given point at a given angle form a substantially conical beam and impinge on the hemisphere at the same angle and reach the same point of the image light spot.

FIGS. 3a–d are cross-sectional views in the main plane of a conductor element according to the invention of which the first main face is a hemisphere and of which the second main face is a cavity in the form of a hemisphere which is concentric with respect to the preceding, said cavity leaving at its circumference a flat edge which in this case is coronal.

The rays of the first and the second main plane are referred to by R and r in this specification, possibly followed by a suitable index. Because the medium outside the first main face and the medium inside the second main face is identical, the limit angle is the same for the reflections on both faces. In the figures it has been chosen to be equal to 38°.

Each light ray which is reflected on the second main face in general and especially as compared with a possible later reflection, behaves as if it originates from the said second main face.

For light rays, which originate from a source point which is situated in the corona on the main diameter the arch of the circumference of the second main face which is reflecting is restricted on the one hand by the ray which is a tangent to said arch and on the other hand by the limit point for which the angle of incidence is equal to $\theta$. These limits are denoted in FIGS. 3a–d.

Figure 3A:
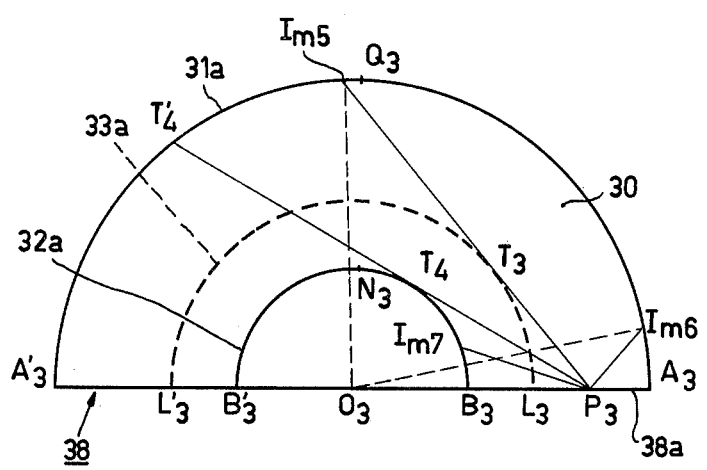

In FIG. 3a the conductor element 30 is bounded by the first hemispherical main face 31a thereof having the center $O_3$ and summit $Q_3$ and by the second main face 38 which comprises a hemispherical cavity 32 which is concentric with the first and furthermore comprises a corona 38a. The main diameter $A_3A'_3$ intersects the second main face at $B_3$ and at $B'_3$. The circumference, in the plane of the drawing, of the hemisphere of radius $R \sin \theta$ is denoted at 33a; it intersects the main diameter at $L_3$ and at $L'_3$.

Because in FIG. 3a the radius $r_3$ of the cavity is smaller than $R \sin \theta$, all light rays which have experienced a reflection to the second main face emerge from the first main face during their later impact on same, if the first main face does not comprise any metallization.

FIG. 3a also shows the opening limit points $I_{m5}$, $I_{m6}$ and the limit point $I_{m7}$, as well as the tangents $P_3T_4$ at the hemispherical cavity 32a and $P_3T_3$ at the circle 33a which correspond to a source point $P_3$. The tangent $P_3T_3$ reaches precisely $I_{m5}$.

The tangent $P_3T_4$ intersects the spherical surface 31a at $T'_4$. The rays which originate from $P_3$ and which impinge upon the first main face between the opening limit points $I_{m6}$ and $I_{m5}$ are reflected on same and collected between $A'_3$ and $L'_3$ as if the cavity 32 does not exist.

The rays which originate from $P_3$ and which impinge upon the first main face between $A_3$ and $I_{m6}$ on the one hand and between $I_{m5}$ and $T'_4$ on the other hand emerge from the conductor element equally as if the cavity 32 did not exist.

The rays impinging upon the second main face between $B_3$ and $I_{m7}$ emerge directly from same; the rays which impinge upon the said second main face between $I_{m7}$ and $T_4$ are reflected on said second face towards the first face where they emerge because, as a matter of fact, to them everything occurs as if they originate from the second main face. In the absence of the cavity, the rays would have impinged upon the first main face between $T'_4$ and $A'_3$, from which main face they would have emerged.

In the absence of a metallization the light balance thus is identical to that of the hemisphere without cavity. Nevertheless, such conductor elements have a great number of advantages, for example, a low weight, an easy moulding operation, saving of material, which advantages are important.

Calculation permits of knowing the ordinates $x_{T4}$ and $y_{T4}$ of $T_4$ as a function of $r$ and of the length $l_4$ of $O_3P_3$:

$$x_{T4} = (r^2/l_4) \quad (17a)$$

$$y_{T4} = (r/l_4)\sqrt{l_4^2 - r^2} \quad (17b)$$

the abscissa $x_7$ of $I_{m7}$:

$$x_7 = \frac{r^2 \sin^2 \theta}{l_4} + \frac{r \cos \theta}{l_4} \sqrt{l_4^2 - r^2 \sin^2 \theta} \quad (17c)$$

and the reflecting arch by:

$$x_{T4} - x_7 = \frac{r^2}{l_4} - \left( \frac{r^2 \sin^2 \theta}{l_4} + \frac{r \cos \theta}{l_4} \sqrt{l_4^2 - r^2 \sin^2 \theta} \right) \quad (17d)$$

When $P_3$ approaches $B_3$, the points $T_4$ and $I_{m7}$ also approach $B_3$ and the length of the arch $T_4I_{m7}$ becomes smaller to become equal to zero when $P_3$ is in $B_3$. When $P_3$ moves away from $B_3$, the arch $I_{m7}T_4$ increases to become equal to $\pi - \theta$ if $P_3$ would be infinite. On the contrary, the opening at which the point $P_3$ in the plane of the drawing sees the said arch $I_{m7}T_4$ is maximum and equal to $(\pi/2) - \theta$ when $P_3$ is in $B_3$. This opening decreases when $P_3$ moves away from $B_3$ and would become equal to zero when $P_3$ would be infinite.

Figure 3B:
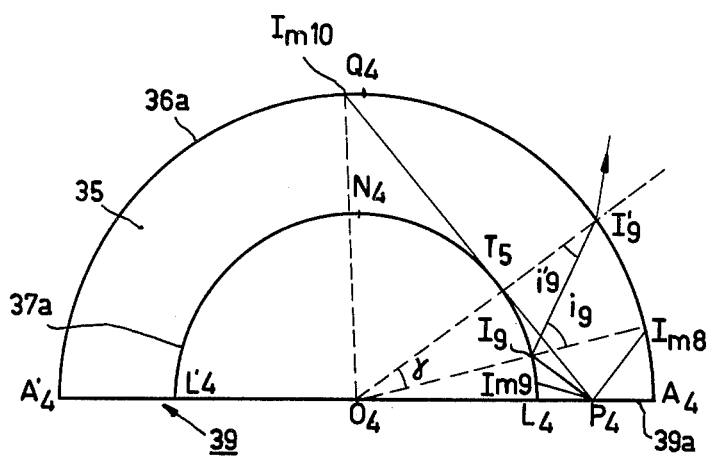

In FIG. 3b the conductor element is bounded by the first hemispherical main face 36 of center $O_4$ and summit $Q_4$ and by the second main face 39 which comprises a hemispherical cavity 37a and a corona 39a. The main diameter $A_4A'_4$ intersects the cavity 37a at $L_4$ and at $L'_4$. The radius $r_4$ of the cavity is exactly equal to $R \sin \theta$.

Rays of the beam which originate from the source $P_4$ which impinge upon the first main face between the two opening limits points $I_{m8}$ and $I_{m10}$ are reflected. Besides the ray $P_4I_{m10}$ which is tangent at $T_5$, no light ray of said beam impinges on the second main face.

Rays which originate from $P_4$ and which in the first impact impinge upon the first main face between $A_4$ and the opening limit point $I_{m8}$ or the second main face between $L_4$ and the limit point $I_{m9}$ immediately emerge from the conductor element.

The beam originating from $P_4$ which during the first impact impinges on the second main face between the limit point $I_{m9}$ and $T_5$ is reflected towards the first main face at such an angle of incidence that in the absence of a metallization the beam emerges from the conductor element. The angle of incidence $i'$ of the first main face of each light ray which has already experienced a reflection on the second main face at an angle of incidence $i$ actually is always equal to $i - \gamma$ where $\gamma$ is the center angle between the two points of impact. Such a light ray is shown at $P_4I_9I'_9$, in which the angle $\widehat{I_9OI'_9}$ is the angle $\gamma$, $i_9 = i'_9 + \gamma$ (18a). For the limit point $T_5$ in which the angle of incidence is 90° the "reflected" light ray impinges on the first main face in a point for which the angle of incidence is exactly equal to $\theta$. In the absence of the complementary metallization, this whole beam of which the first point of impact is between $I_{m9}$ and $T_5$ thus leaves the conductor element upon the second impact.

Figure 3C:
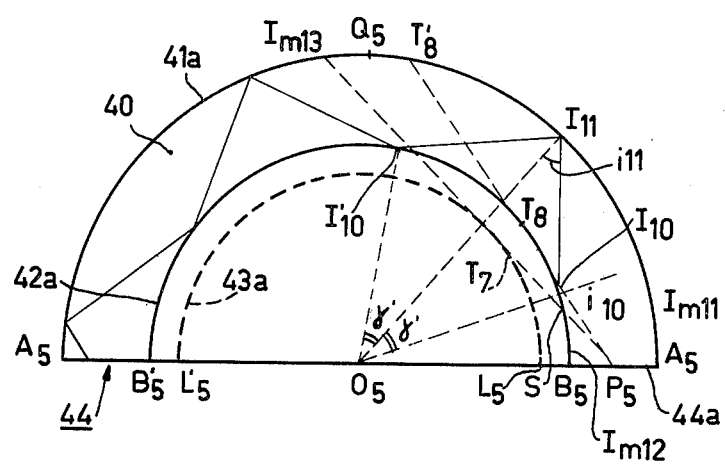
Figure 3D:
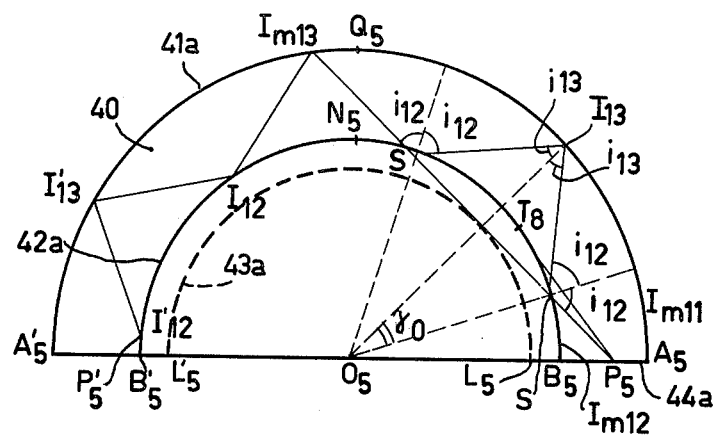

FIGS. 3c and 3d relate to the case in which the radius $r$ of the second main face is situated between R and $R \sin \theta$. For clarity, the figure is shown twice.

In FIGS. 3c and 3d the conductor element 40 is bounded by its first hemispherical main face 41a having centre $O_5$ and summit $Q_5$ and by its second main face 44 which has a hemispherical cavity 42a which is concentric with the first and a corona 44a.

The main diameter $A_5A'_5$ intersects the second main face at $B_5$ and at $B'_5$. The semi-circle of which the radius is $R \sin \theta$ is shown at 43a. It intersects the main diameter $A_5A'_5$ at $L_5$ and at $L'_5$. The radius $r_5$ of the cavity is such that $$R > r_5 > R \sin \theta$$

This figure also shows for a source point $P_5$ the tangent $P_5T_8$ at the second main face of which the elongation at $T'_8$ intersects the first main face and the tangent $P_5T_7$ at the semi-circle 43a. It intersects the first main face in the opening limit point $I_{m13}$ and the second main face in the points S and S'. The point S is also an opening limit point.

For each light ray, for example for $P_5I_{10}I_{11}I'_{10}$ originating from $P_5$ (FIG. 3c) and which, for example, is reflected totally (for example as a result of the presence of a metallization which forms a mirror) successively at least once on the two main faces as a result of the property of the spheres, the angles of incidence $i_{10}$ on the second main face and $i_{11}$ on the first main face generally remain constant during the whole path until the collection. Moreover $$\frac{\sin i_{10}}{\sin i_{11}} = \frac{R}{r_5} \quad (20) \text{ and } i_{10} - i_{11} = \alpha' \quad (18b)$$

wherein $\alpha'$ is the value of the central angle O between two successive points of impact, one on the first the other on the second main face, for example the angle $\widehat{I_{11}O_5I_{10}}$.

Thus if the medium outside the conductor element on the side of the first main face and the medium outside the conductor element on the side of the second main face have the same indices of refraction for a light ray the angle of incidence of which on the first main face is such that said ray is reflected totally, for example if the first impact takes place between the two opening limit points $I_{m11}$ and $I_{m13}$, the angle of incidence of said ray on the second main face is sufficiently large to cause total reflection to occur. This is verified a fortiori if the index of refraction of the medium outside the conductor element on the side of the first main face is larger than the index of refraction of the medium outside the conductor element on the side of the second main face.

It may be concluded that each light ray which originates from $P_5$ and the first point of impact of which lies on the second main face between the opening limit point S and $T_8$ as a result of which it has an angle of incidence with respect to the first main face which is larger than $\theta$ is reflected on the two faces of the conductor element and is finally collected. The corresponding beam is that one of which the first impact, in the absence of the cavity, would take place on the first main face between $T'_8$ and $I_{m13}$.

On the contrary, a light beam of which the first impact takes place on the second main face, directly leaves the conductor element if said impact takes place between $B_5$ and the limit point $I_{m12}$ and a light ray of which the first point of impact is situated on the second main face between $I_{m12}$ and the opening limit point S is reflected on same and, in the absence of a metallization on the first main face, emerges from the conductor element during the next impact on the first main face, its angle of incidence being smaller than the limit angle.

FIG. 3d shows the path of the limit ray $P_5SI_{13}S'I_{m13'}$ $I_{12'}$, $I'_{13}$, $I'_{12}$, $P'_5$, of which the angles of incidence $i_{12}$, $i_{13}$ and the central angle between two points of impact $\gamma_o$ are connected by the following relationships:

$$i_{13} = \theta \tag{21a}$$

$$i_{12} = (\pi/2) - \gamma_o \tag{21b}$$

$$\text{and } \sin i_{12} = \frac{R}{r_5} \sin \theta = \frac{R}{r_5} \frac{n_2}{n_1} \tag{21c}$$

($n_2$ being the index of refraction of the exterior medium and $n_1$ that of the conductor element). This ray also passes through the point S' and through the opening limit point $I_{m13}$.

This relation does not depend on the position of the point $P_5$. Thus, with the exception of the losses by absorption or during reflections — which losses are slightly higher by increase of the length of the path (the absorption losses over 10 cm are in the order of 10%) and of the number of incidences — the light balance is the same whether the conductor element is provided with a cavity or not.

The only exception would relate to the case of the figure for which $I_{m12}$ would lie beyond S, the limit angle corresponding to the second main face being much larger than the limit angle corresponding to the first main face. This case is very unlikely.

If in the case in which $r \leq R \sin \theta$ (FIGS. 3a and 3b) the rays originating from a source point are dispersed upon arrival over the whole segment of length R (1 − $\sin \theta$), in the case in which $r > R \sin \theta$ (the case of FIGS. 3c and 3d), however, the rays originating from a given point are concentrated on the segment $A'_5B'_5$. So the brilliance is greater.

All the above reasonings, as well as those which still follow, have been conducted as a function of the points and of light rods. It will be obvious that the reasoning would be the same as regards the light areas of small dimensions and of indetermined shape, as well as regards sources of which the various light points are not exactly co-planar.

FIGS. 4a, 4b and 4c show very diagrammatically the sectional view of a conductor element. The sectional view has been taken through the plane which is perpendicular to the main diameter through the source point which is denoted by $P_6$ in FIG. 4a, by $P_7$ in FIG. 4b, and by $P_8$ in FIG. 4c. In these figures, the circumference of the conductor 11 is shown in solid lines and the circular circumference of the line of intersection of the plane of intersection with the zone 11 is denoted by 16a in FIG. 4a, 16b in FIG. 4b, 16c in FIG. 4c and the "cut-off" region is shaded. The summits of said three archs are denoted by $N_6$, $N'_6$, $N''_6$, respectively.

In such a conductor element the light rays can be reflected with suitable angle of incidence either on the first main face or on the bases of the conductor element.

A light ray impinging on the first main face during its first impact at such an angle of incidence that total reflection occurs, traverses the chords which subtend a great circle until either the collection thereof or until the incidence of a base of the conductor element, if the great circle is interrupted. This also applies to a light ray which has already experienced one or more reflections on the bases of the conductor element.

In fact when a light ray impinges on one of the bases of the conductor element, it emerges or, with suitable angle of incidence, it is reflected towards the interior of the conductor element. It may then either meet the opposite basis on which it is reflected or the first main face on which it is reflected with suitable angle of incidence (or from which it emerges in the opposite case). If it is reflected, it traverses the chords which subtend a great circle until its collection or, if said great circle is interrupted by one of the bases, until its meeting with said base.

FIGS. 4a, 4b and 4c show, also in solid lines, the path in the plane of intersection of the studied light rays. The circumference of the first main face in the plane of the Figure is denoted by 11ac, 11ad, 11ae, respectively, and the circumference of the second main face is denoted by 12ac, 12ad, 12ae in FIGS. 4a, 4b and 4c.

The two bases in FIG. 4a are denoted by D and G, in FIG. 4b by E and F and in FIG. 4c by J and K, said different letters being completed by suitable indices. For example, index 1 denotes the meeting point of each base with the second main face of the conductor element and with the plane of section, index 2 denotes the meeting point of each base with the end of the circumference of the first main face situated in the plane of the figure. Index 3, also in FIGS. 4a and 4b, denotes the meeting point of each base of the main face of the conductor element and of the plane of section and $J_3$ and $K_3$ in FIG. 4c denote the meeting points of the plane of section and of the main faces of the conductor element.

The angles of value $\pi - 2$ with the source points $P_6$, $P_7$ and $P_8$ as origin and situated in the plane of section are also denoted by $\overline{M_1P_6M'}_1$, at $\overline{M_2P_7M'}_2$ and at $\overline{M_3P_8M'}_3$. The sides of these angles intersect, on the one hand at $U_1$ and $U'_1$ and at $U_2$ and $U'_2$, respectively, the elongation of the archs $D_2G_2$ and $E_2F_2$ in the FIGS. 4a and 4b, and on the other hand, at $U_3$ and $U'_3$, the arch $J_2K_2$ in FIG. 4c.

It will be obvious that it is useless to describe all kinds of cases in this specification. It is restricted hereinafter to the description of what happens with a few light rays propagating in the plane of section until they meet the first main face for the first time.

It has also been decided to consider in the following remarks the points $D'_2$ and $G'_2$ on the arch of a circle $D_3G_3$, $E'_2$ and $F'_2$ on the arch of circle $D_3F_3$, $J'_2$ and $K'_2$ on the semi-circle $K_3G_3$, as well as the points $Q_6$, $Q'_6$ and $Q''_6$, the summits of the archs $D_2G_2$, $E_2F_2$, $J_2K_2$.

On the other hand, the remarks are made starting from one of the halves of the conductor element because this is symmetrical with respect to the main face of the conductor element in which the source point in question is situated.

A light ray which meets a base at a small angle of incidence emerges from the conductor element in the absence of a complementary metallisation. A ray which is reflected on a basis propagates up to the next impact as if the same originated from a symmetrical point of the source point relative to the base.

In FIG. 4a each ray originating from $P_6$ and propagating in the plane of section and the first impact of which is on the base D, leaves the conductor element if the impact takes place between $D_1$ and $M_1$ as is the case for the ray $P_6I_3I'_3$; likewise each ray emerges from the conductor element which originates from $P_7$ and which in FIG. 4b propagates in the plane of section and the first impact of which is at E between $E_1$ and $E_3$, as is the case with the ray $P_7I_5I'_5$.

In FIG. 4a a light ray is reflected to the interior of the conductor element if the impact takes place between $M_1$ and $D_3$, as is the case for the ray $P_6I_4I'_4$. If it does not emerge at $I'_4$ the light ray begins a path through the cortical region in the plane which is symmetrical with respect to D and it has a chance to be collected usefully whether it has met a base or not.

A light ray of which the first impact takes place between $D_3$ and $D'_2$ (FIG. 4a) or between $E_3$ and $E'_2$ (FIG. 4b) or between $J_3$ and $J'_2$ (FIG. 4c) begins a path in the cortical region which is interrupted by an impact on the bases D, E or J: if the first impact of said ray takes place between $E_3$ and $M_2$ (FIG. 4b) or between $J_3$ and $J'_2$ (FIG. 4c) the light ray during said impact emerges from the conductor element, this is the case with the rays $P_7I_{6a}I_{6-bI_{6c}}$ (FIG. 4b) and $P_8I_{8a}I_{8b}I_{8c}$ (FIG. 4c); if on the contrary the first impact takes place between $D_3$ and $D'_2$ (FIG. 4a), between $M_2$ and $E'_2$ (FIG. 4b), then the light ray is reflected on the base D or E, it begins a path in the cortical region in the plane which is symmetrical with respect to the said base, it is collected and can possibly be collected usefully. This is the case with the ray $P_7I_{7-bI_{7c}}$ (FIG. 4b).

Each light ray the first impact of which takes place in the cortical region between $D'_2$ and $N_6$ (FIG. 4a) between $E'_2$ and $N'_6$ (FIG. 4b) and between $J'_2$ and $N''_6$ (FIG. 4c) traverses a normal path in the cortical region without the bases intervening. So it is collected normally. $P_6D'_2D_2$, $P_6G'_2G_2$, $P_7E'_2E_2$, $P_8J'_2J_2$, $P_8K'_2K_2$ in FIG. 4 denote the light rays originating from $P_6$, $P_7$, $P_8$ and the limit of the beam of rays which traverse a normal path in the cortical region.

In practice the opening of the conductor element in FIGS. 4a and 4b is $\pi - 2\theta$ for which the height of the spherical segment is smaller than $R \sin \theta$; this is equal to the angle $\widehat{J_2P_8K_2}$ in the case of FIG. 4c in which the height of the spherical segment is larger than $2R \sin \theta$.

So if the arch of the spherical zone which forms the first main face of a conductor element having the shape of a spherical segment having two bases is smaller than $\pi - 2\theta$, the aperture of the said conductor element is in face substantially equal to $\pi - 2\theta$. If said arch is larger than $\pi - 2\theta$, the opening of the said conductor element is equal to the arch itself.

So very thin conductor elements can be made having an opening which is substantially equal to $\pi - 2\theta$, which may have advantages in the case of lack of space. It may also be preferred to use conductor elements having an opening larger than $\pi - 2\theta$ having a better efficiency. So it is obvious that the conductors including conductor elements having the shape of a spherical segment having two bases and provided with a cavity in the second main face, which, for example, gives said second main face a homothetical shape of the shape of the first main face, are according to the invention. These show in particular the advantage of a low weight.

There should be well distinguished between on the one hand the conductor elements of the conductors according to the invention of which the first main face is a spherical zone (and this irrespective of the shape of their second main face) and on the other hand a number of known conductor elements. In particular, the conductor elements of the light conductors according to the invention are to be distinguished from optical fibers of which the cross-section is square, rectangular or even circular. If the fibers are bent in the form of a circle, the shape is nevertheless completely different from a cortical region of a sphere in which the light conduction takes place according to the invention. The transfer efficiency in these fibers is much smaller than in the embodiments of the invention. It is also of importance to distinguish them from the conductor elements of which the first main face is not circular because the cross-section of such conductor elements through the plane of propagation of the light ray cannot be circular. In general it is a cone. The angle of incidence is not maintained and the light rays are collected in a much less efficient manner. The light transfer can only be lower.

FIGS. 5a and 5b are a sectional view (taken on the line CC of FIG. 5b) and a plan view, respectively, of a light conductor 20 according to the invention which has a hemispherical conductor element 21, two optical fibres, one 22 for the injection and the other 23 for collection, and three extra metallisation faces which are denoted by 25, 26a and 26b.

The conductor element 21 is bounded by a first main face 81a, and by a second main face 82, which is parallel to the tangential plane at the summit of the hemisphere relative to the plane to which the two fibres 22 and 23 are perpendicular.

The center of the hemisphere is denoted by $O_6$, the main diameter of $A_6A'_6$, the two limit points by $L_6$, $L'_6$, the limit angle being taken into account, and the semi-circle 84a of radius $O_6L_6 = O_6L'_6 = R \sin \theta$ is shown in broken lines which in the plane of the drawing is the circumference of the hemispherical face 84 which bounds the area of the cortical region.

The intersection of said surface 84 with the second main face 82 defines on the same a region 82a of the cortical region at the circumference on which the two optical fibers emerge.

The emitter is placed at 27 at the entrance of the fiber 22. Its dimensions and those of the injection fiber are such that the injection takes place between the two points $P_6$ and $P_7$ which themselves are situated within the cortical segment $A_6L_6$. Actually, in the case of FIG. 5a, the points $P_6$ and $P_7$ limit the above-mentioned injection zone.

In FIG. 5a, the opening limit light rays $I_{m61}$ and $I_{m62}$ (tangent to the limit circle) are shown for said two source points $P_6$ and $P_7$ for the point $P_6$, $I_{m71}$ and $I_{m72}$ (tangent to the limit circle) for the point $P_7$. Also shown in FIG. 5b is the projection for said two source points of the circles on which said opening limit points are situated and which are denoted by $I'_{m61}I''_{m61}$, $I'_{m71}I''_{m71}$, $I'_{m62}I''_{m62}$, $I'_{m72}I''_{m72}$.

The dimensions of the section of the collecting fiber are so much larger that collection can be carried out throughout the emergence area of the light rays which are transmitted by total reflection from $A'_6$ up to and including $L_6$ in the plane of FIG. 5a.

In the case of FIG. 5a the points $A'_6$ and $L'_6$ limit, in the plane of the figure, the zone which above is termed collecting zone as well as the emergence area.

The length of the fibers 22 and 23 may be small or even be equal to zero; the said places for the transfer from the emitter to the conductor and/or from the conductor to the receiver then coincide with the injection and collection zone.

It may also be important to provide such a conductor in the light transfer places of the spaces in which the emitter and the receiver are accommodated, dipped, adhered or encapsulated. If the optical fiber have a length zero the injection and collection zones may be situated within the conductor element beyond the second main face.

In the device shown in FIG. 5 the conductor carries, directly and separately, the emitter and the receiver which it supports.

FIGS. 5a and 5b show two light rays originating from $P_7$: $P_7I_{70}I'_{70}P'_7$ in the plane of FIG. 5a and $P_7I_{706}I'_{706}P'_7$ in a plane which makes an angle with the plane of FIG. 5a and the line of intersection of which with the hemisphere 20 is denoted by 29. The angle of incidence of these two light rays is such that there is no total reflection, but that they are reflected by the metallization faces 26a and 25 which are deposited on the first main face 81a.

The forms given to the metallization faces in the FIGS. 5, namely those of a half cap for 26a and 26b and that of a zone which is symmetrical for the face 25 are particularly important.

A perfect insulation can be obtained with such a conductor element between the emitter and the receiver; in addition said insulation can be improved by the presence of a cavity according to the invention which is not shown in the drawing.

It should be noted that in the figures the metallization faces project beyond the total reflection surfaces; of course this is not inevitable but may be useful, especially for series manufacture in which the metallization tolerances may be large.

The photocoupler shown in FIGS. 6a and 6b comprises a support 61 which mainly consists of a plate of insulating material, for example glass or ceramic, in which by local deposition two metal faces 62 and 63 of gold or another material have been formed which can be readily soldered to semiconductor crystals in which the light emitter 64 and the photoreceiver 65 are accommodated. These two faces 62 and 63 are connected to two of the connections which are passed through the insulating material of the support 61.

The emitter 64 is, for example, an electroluminescent semiconductor diode of gallium arsenide and the photoreceiver is, for example, a silicon photodiode.

For the emitter 64 the contacts are provided on the one hand on the lower face of the single crystal, via the metal face 62 on which it is soldered, and, on the other hand, via a wire 67 which is welded to the contact face 69 and which in addition is connected to one of the connections 66 which is insulated from the faces 62 and 63.

The contacts of the receiver are made via a wire 68 which is soldered to the contact face 70 and which in addition is connected to another connection 66 which is insulated from the faces 62 and 63 and via the lower face of the photodiode 65, which is soldered to the metal face 63.

The assembly is covered with a light conductor according to the invention which simply consists of a hemispherical conductor element 71 and is manufactured from a transparent material having a high index of refraction (for example, polycarbonate having an index of 1.58).

This conductor element 71 comprises a first hemispherical spherical main face 72. The second main face 73 bounds a hemispherical cavity 74 which is concentric with the structure of the conductor element; it terminates at the periphery with a flat corona 73a of which the plane is parallel to the tangent at the summit of the hemispherical conductor element 71.

The hemispherical conductor element 71 supports on its face 72 three complementary metallization faces 75a, 75b and 76.

The conductor element 71 bears on the emitter 74 and on the photoreceiver 75 on two zones 77 and 78 of the corona. These two zones serve as a supporting point and a connection point, the said connection being effected by means of a likewise transparent resin having the same index as the material of the conductor 71. They broadly coincide with the injection and collection zones which are not shown in the figure.

The device could be realized by moulding the conductor on the previously mounted assembly of supporting plate and the semiconductor crystals.

The photocoupler may be covered with a cap or an opaque resin which is not shown in the drawing.

Applicants have manufactured such photocouplers in which the conductor which is formed only by a conductor element is of polycarbonate ($n = 1.58$) and has as a radius $R = 1.2$ mm, $r = 0.7$ mm) ($R \sin \theta = 0.75$ mm); the emitter and receiver crystals each have a length of 0.4 mm. The device operates perfectly, the light transfer is excellent and in the absence of a complementary metallization said device has an electric insulation of 6000 volts between emitter and receiver. In addition it is very rigid.

One of the advantages of said photocoupler is that several of them can be accommodated in the same housing. Applicants have manufactured in particular photocouplers having four paths by arranging in the same housing four photocouplers according to the invention. The light, if any, remaining between one position and another position is eliminated entirely by a black plastic envelope. The devices operate perfectly.

What is claimed is:

1. A light conductor, comprising at least one element for conducting light by total reflection, said element being formed from a material having an index of refraction $n_1$ and has a first main face which bounds an exterior medium having an index of refraction $n_2$ which is lower than $n_1$, the first main face having the shape of a part of the surface of a sphere, said part being situated on a side of an arch of a great circle on the sphere, an injection zone of light situated in the proximity of a first end of the arch, a collecting zone of light situated in the proximity of a second end of said arch, the location of the injection and collection zones being such that the distance between each of the collection and injection zones and the center of the sphere being at most equal to the radius of the said sphere and at least equal to the product of the radius of the sphere and the sine of a limit angle equal to the arcsine $n_2/n_1$.

2. A light conductor as claimed in claim 1, wherein the injection zone is provided at a distance to the center of the sphere situated between the radius of the sphere and the 11/10 of the product of the said radius and the sine of said limit angle.

3. A light conductor as claimed in claim 1, wherein the arch of the great circle of the conductor element is substantially a half great circle.

4. A light conductor as claimed in claim 1, wherein the arch of the great circle of the conductor element is substantially a great circle.

5. A light conductor as claimed in claim 1, wherein the first main face of the conductor element is a part of a symmetrical hemispherical zone.

6. A light conductor as claimed in claim 1, wherein the conductor element is also bounded by a second main face which lies opposite to the first.

7. A light conductor as claimed in claim 1, wherein said conductor element is bounded laterally by two flat bases.

8. A light conductor as claimed in claim 3, wherein said conductor element has substantially the shape of a spherical notch.

9. A light conductor as claimed in claim 3, wherein said conductor element has substantially the shape of a symmetrical spherical segment having two bases.

10. A light conductor as claimed in claim 6, wherein said conductor element has substantially the shape of a hemisphere.

11. A light conductor as claimed in claim 1, wherein said conductor element has substantially the shape of a sphere.

12. A light conductor as claimed in claim 6, wherein said second main face is substantially flat and substantially parallel to the tangent at the summit of the said first main face.

13. A light conductor as claimed in claim 6, wherein the said second main face has a cavity bordered by an edge.

14. A light conductor as claimed in claim 13 wherein said cavity is a spherical surface part which is coaxial to the first main face.

15. A light conductor as claimed in claim 14, wherein said first and second main faces are concentric and homothetic.

16. A light conductor as claimed in claim 13 wherein the dimensions and the position of the said cavity are such that it is enclosed in part of the sphere, that the surface of the cavity is concentric with the part of the spherical surface which forms the first main face, and wherein the radius of the cavity is equal to the product of the radius of the spherical surface of the said first main face with the sine of the limit angle.

17. A light conductor as claimed in claim 14, wherein the radius of said spherical surface which forms the second main face is larger than the product of the value of the radius of the spherical surface of the first main face with the sine of the limit angle.

18. A light conductor as claimed in claim 9, wherein the height of said spherical segment is smaller than 2R sin $\theta$, where R is the radius of the sphere corresponding to the first main face and where $\theta$ is equal to said limit angle.

19. A light conductor as claimed in claim 9, wherein the height of said spherical segment is larger than 2R sin $\theta$, where R is equal to the radius of the sphere corresponding to said first main face and where $\theta$ is equal to said limit angle.

20. A light conductor as claimed in claim 10, wherein said conductor element is elongated by an extra conductor in the firm of a cylindrical column the outside diameter of which is substantially equal to the radius of the first main face of the said conductor element.

21. A light conductor as claimed in claim 1, further comprising at least one means for transferring the light between the conductor element and the exterior medium including optical fiber having a suitable section which reaches one of the ends of the arch of the great circle.

22. A light conductor as claimed in claim 21, wherein said fiber has a section of a dimension which is smaller than the product of the radius of the first main face with the difference between 1 and the sine of the limit angle, and wherein said fiber reaches substantially between the end of the main diameter and the point of which the distance to the center is equal to the product of the said radius with the sine of said limit angle.

23. A light conductor as claimed in claim 1, wherein at least one place for transmission between the conductor and the exterior medium is provided with a space for accommodating opto-electronic elements.

24. A light conductor as claimed in claim 1, wherein said conductor comprises glass.

25. A light conductor as claimed in claim 1, wherein said conductor comprises plastic material.

26. Apparatus as recited in claim 1, further comprising a light emitter on one side of said great arch, and a light receiver on the other side of said great arch.

27. Apparatus as claimed in claim 26, wherein the first main face of the conductor element is hemispherical and that the bases for the transfer of the light from the light emitter to the conductor and from the conductor to the light receiver are substantially coplanar.

28. Apparatus as claimed in claim 27, wherein at least one place for the transfer of light is directly on the second main face of the conductor element.

29. Apparatus as claimed in claim 26, wherein said conductor supports separately on the one hand the emitter and on the other hand the light receiver.

30. Apparatus as claimed in claim 26, wherein said conductor bears on a support.

31. Apparatus as claimed in claim 26, wherein said conductor is of a plastic material and that it is moulded on at least the emitter and the light receiver.

* * * * *